Figure 1:
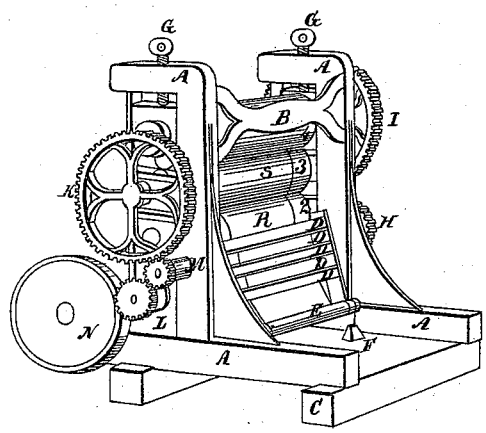

E. M. CHAFFEE.
Making Rubber Fabrics.

Patented Aug. 31, 1836.

UNITED STATES PATENT OFFICE.

EDWIN M. CHAFFEE, OF ROXBURY, MASSACHUSETTS.

APPLICATION OF CAOUTCHOUC TO CLOTHS, LEATHER, AND OTHER ARTICLES.

Specification of Letters Patent No. 16, dated August 31, 1836.

*To all whom it may concern:*

Be it known that I, EDWIN M. CHAFFEE, of Roxbury, in the county of Norfolk and Commonwealth of Massachusetts, have invented, made, and applied to use a new and useful improvement in the preparing, coloring, and applying india-rubber to cloth of all kinds, leather, and other articles without the use of a solvent, which I call "Chaffee's Improvement in Rubber," specified in the words and figures following and exhibited in the drawings annexed.

The india rubber undergoes an operation preparatory to its being applied to the cloth, and other articles, and the following is a description of that part of the machinery, and apparatus employed for the purpose. A hollow cylinder, or roller six feet long, and twenty seven inches in diameter heated by steam, or otherwise to about two hundred degrees of Fahrenheit, is surmounted by another cylinder of like length, and heated in like manner, and eighteen inches in diameter, the large, and small cylinders come in contact with each other on one side at about ten inches distant from the top of the larger one. The large cylinder revolves much faster than the small one, so that there is a compound rolling, and slipping action between the cylinders. Five bars are placed on the top of the large cylinder side by side each other leaving a space of about three fourths of an inch between them, the bars are one and a half inch thick, twelve inches wide, and about six feet long, the edges which lie in contact with the cylinder are convex or circular, and so constructed that when one corner of the edge touches it, the other recedes from it thus leaving a wedge like space for the rubber to enter beneath the bars. What I mean by the corner of the edge is the angles formed by the two sides of the bars, and their circular edges, the one being an acute, and the other an obtuse angle, which are more or less acute or obtuse according to their situation on the cylinder, the said bars being substitutes for so many cylinders, but are better adapted to sifting the coloring between them, they are held in contact with the cylinder, or nearly so by weights or screws arranged for the purpose. If the rubber is to be colored, the coloring matter in fine powder should be sifted, or otherwise put into the spaces between the bars where it will be incorporated with the rubber as it passes between the bars and the cylinders.

A revolving apron is attached to the machine which carries the rubber between the two cylinders, or a plank may be substituted if placed nearly in contact with the underside of the small cylinder, and the rubber put on in contact with the cylinder.

The operation of the foregoing apparatus is as follows: The rubber is first cut into pieces about two inches square and from one eighth to one fourth of an inch thick, it is then spread upon the apron that conveys it to the cylinder where the compound rolling and slipping action of the heated cylinders softens and tears the rubber into fine threads, or thin sheets which at the same time mixes with the coloring which is sifted into the spaces between the bars, thus it passes all the bars successively, and undergoes this operation several times before it goes from the preparing and coloring part of the machine to the coating or covering part of the machine. The coating or covering part of the machine or apparatus for applying the prepared rubber to the cloth, and other articles consists of four hollow cylinders six feet long heated by steam or otherwise to about two hundred degrees of Fahrenheit, placed one above another. For conveniently describing their operation I number them one, two, three, and four, beginning at the bottom. No. 1, is eighteen inches in diameter, Nos. 2, and 3, are each one foot in diameter, and No. 4, is eighteen inches in diameter. No. 3, moves much slower than the others, thus creating a compound rolling, and slipping action between the surfaces of No. 2, and No. 3, and also between No. 3, and No. 4. Sometimes the three first cylinders only are used, in which case the gearing for driving the fourth cylinder is disengaged, and the cloth or other article to be coated is made to pass into the covering machine between the 2nd, and 3d, cylinders, thence it passes half around the 2d, and 1st, cylinder, the rubber side coming in contact with the first, and passing nearly around it, whence it is taken off and rolled up. The prepared rubber is conveyed by hand, or otherwise from the preparing part of the machine while warm, and put into the hopper which is placed between 2d, and 3d, cylinder to receive it. The hopper is about two inches narrower than the cloth, or other article intended to be coated. The cloth enters between the bottom and 2d, cylinders, while the rubber enters between the bottom, and the third cylinder, where the coating of the cloth is effected. There is advantage in passing the rubber between the third, and fourth cylinder of the coating part of the machine before it comes in contact with the cloth, which warms and softens it so that it will adhere better to the cloth to which also the rubber is presented more uniformly than when promiscuously put into the hopper. I sometimes put the prepared rubber directly upon the cloth, or other article to be covered between the 2d, and 3d, cylinders, and then disengage the gearing of the third cylinder, which will not then revolve. The bottom of the hopper in this case does not enter so far between the cylinders. The sides of the hopper must in all cases enter as far as possible without being pinched by the cylinders, to which they must be well fitted.

Another mode of using this machine is as follows: The rubber alone enters between the 2d, and 3d, cylinders where it is formed into a sheet which passes half around the 2d, the cloth entering at the same time between the 2d, and 1st, where the sheet of rubber is transferred from the cylinder to the cloth then passing nearly around the first cylinder, where it is taken off and rolled up as before.

In coloring I sometimes make the rubber into sheets, apply the coloring, and roll the same into a mass, and then pass it through the cylinders, repeating until sufficiently colored. Again I mix the coloring with small pieces of rubber, and let them both go between the cylinders, or cylinder, and bars together—mix more, and repeat until sufficiently colored. When it goes between a bar and cylinder, or between two cylinders, one going faster than the other, the rubber comes through in fine particles so long as the coloring is added.

The machine is an entire one although in the drawings herewith for the purpose of exhibiting more distinctly the several parts, and operations it is divided into sections Nos. 1, and 2, and Nos. 3, and 4.

Figure 1, is the coating part of the machine, and a perspective view of it exhibited in the drawing annexed A A A. A A A is a cast iron frame or housing for the rollers or cylinders. B, is a brace connecting the two parts of the frame together. C, C, are two timbers upon which the frame stands. 2, 3, and 4, are the cylinders. No. 1, cylinder is behind the frame of bars D. D, D, D, D, D, are five bars called cheeks through which the cloth passes before it enters the rolls. E, is a roll upon which the cloth is wound before being coated. F, is a cheek weight attached to a cord passing over roll E. G, G, are screws regulating the pressure of the rolls 1, 2, 3, and 4. H, is a cog-wheel that drives cylinder No. 1. I, is a cog-wheel attached to the cylinder No. 4, and is driven by the wheel H. K, is a cog-wheel attached to cylinder No. 3. L, is a cog-wheel upon the roll No. 1.

M, is a pinion matching with K and L, and serves to give the proper direction to the wheel K, L being the driving wheel.

N, is a pulley attached to the roll, or shaft O, seen in the sectional view, the shaft having a pinion upon its other end which drives the cog-wheel H.

At R, is seen the cloth passing between the cylinders two and three. At S, is seen a sheet of india rubber which comes in contact with the cloth while passing between the cylinders 2 and 3.

P, in the sectional view is a roller driven by the short belt from the shaft O.

Q, is a small roll upon which the cloth is wound when it leaves the cylinder No. 1. It is made to revolve by resting upon the rolls O, and P. The surface of O, and P, revolve a little faster than the cylinder No. 1.

At T, the cloth is seen leaving No. 1, cylinder.

Between the cog-wheel H, and the frame A, is a cog-wheel upon the cylinder No. 1, and also one upon the cylinder No. 2, the wheels being the same size of the cylinders to which they respectively belong. That upon No. 1, drives the one upon No. 2, and consequently the cylinder No. 2.

Figure 2:
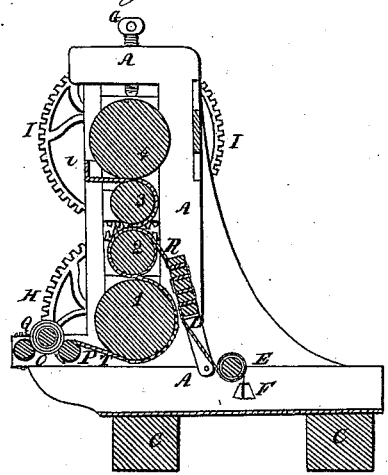

Fig. 2, is a sectional view, the letters on which refer to the same parts as those on No. 1. U is a hopper not seen in the perspective, into which the prepared rubber is put by hand or otherwise while hot as it comes from the preparing apparatus. When three rolls only are used the hopper is put upon the opposite side of the cylinders between Nos. 2 and 3.

Figure 3:
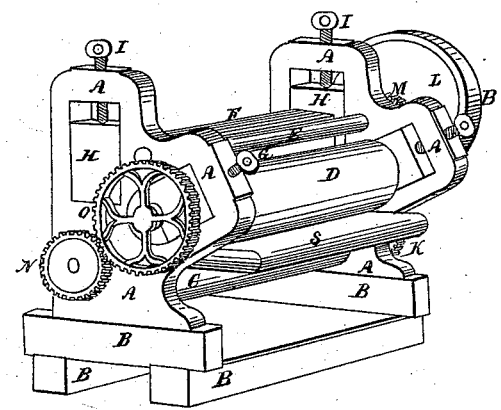
Figure 4:
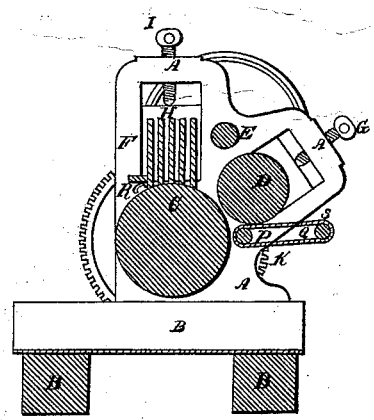

Fig. 3, is a perspective view of the preparing part of the machine A A A. A A A, is a frame of cast iron. B B B B, are timbers upon which the frame rests. C, is a large cylinder 6 feet long, and 27 inches diameter. D, is a cylinder 6 feet long, and eighteen inches diameter. E, is a shaft 6 inches diameter. M, is a pinion upon the shaft E, which drives the cog-wheel K, and consequently the cylinder C. K, is a cog-wheel upon the cylinder C. L, is a pulley upon the shaft E, which is the first power. N, is a cog upon the cylinder C, which drives the cog-wheel O, upon the cylinder D. G, G, are screws regulating the pressure of the cylinders. F, F, are five bars of iron seen more distinctly in the sectional view. They are one foot wide, 1¾ inches thick, and about 7 feet long. H, H, are two blocks of iron having holes in them corresponding to the end of the bars F, into which the bars are put, and fastened by keys. I, I, are screws regulating the pressure of the bars upon the cylinder C. S, is an apron, or endless belt which carries their rubber to be prepared between the two cylinder C, and D, (the same is seen more distinctly in the sectional view). P, Q, are rolls around which the apron revolves. (The apparatus for propelling the rolls P, Q, is not represented.) At R, in the sectional view is seen the prepared rubber as it leaves the last bar, and shrinks up into a mass. Fig. 4, is a sectional view, the letters of which refer to the same parts as those in Fig. 3.

What I claim as new, and my invention is—

1. The preparation, and application of india rubber to all kinds of cloths, leathers, and other like substances without the use of a solvent in the manner aforesaid.

2. I also claim the mixing of coloring with india rubber without bringing it into a state of solution in the manner above described. And I further claim the uses of the heated cylinders with the rolling, and slipping action thereof as applicable to india rubber in the manner aforesaid, thereby preserving the strength of the rubber, and at the same time applying it to and covering the cloths, leathers, and other like substances with greater facility, and at less expense, than by any other process heretofore known, or used.

EDWIN M. CHAFFEE.

Witnesses:
HORATIO BASS,
D. A. SIMMONS.